US005144668A

United States Patent [19]
Malek et al.

[11] Patent Number: 5,144,668
[45] Date of Patent: Sep. 1, 1992

[54] SIGNAL OVERLAP DETECTION IN A COMMUNICATION SYSTEM

[75] Inventors: Charles J. Malek, Crystal Lake; James A. McDonald, Buffalo Grove, both of Ill.

[73] Assignee: Motorola, Inc., Schaumburg, Ill.

[21] Appl. No.: 646,538

[22] Filed: Jan. 25, 1991

[51] Int. Cl.⁵ .................................................. H04L 9/00
[52] U.S. Cl. ........................................ 380/48; 375/114
[58] Field of Search ........................ 380/48; 375/114; 370/100-108

[56] References Cited

U.S. PATENT DOCUMENTS

| | | |
|---|---|---|
| 4,636,791 | 1/1987 | Burke et al. . |
| 4,692,945 | 9/1987 | Zdunek . |
| 4,701,944 | 10/1987 | Howard et al. . |
| 4,723,264 | 2/1988 | Susuta et al. . |
| 4,817,148 | 3/1989 | Lafferty et al. .............. 380/48 |
| 4,825,193 | 4/1989 | Siwiak et al. . |
| 4,831,647 | 5/1989 | D'Avello et al. . |
| 4,885,778 | 12/1989 | Weiss ................................ 380/48 |
| 5,003,598 | 3/1991 | Kunstadt ........................... 380/48 |

*Primary Examiner*—Thomas H. Tarcza
*Assistant Examiner*—David Cain
*Attorney, Agent, or Firm*—Susan L. Lukasik; Raymond A. Jenski; Steven G. Parmelee

[57] ABSTRACT

In frequency-hopping spread-spectrum systems, it is necessary to maintain frequency and bit synchronization (sync) between the transmitter and receiver in order to maintain quality data recovery at the receiver. Two transmissions in adjacent hop-time intervals may overlap because of various time delays within the system. Collision bits (203 and 207) are used to realign the transmitted messages in time. The base station (103) manufactures (401) the collision bits (203 and 207) and transmits them to the communication unit (101), which echoes back (503) the bits on its next transmission. If the bits received at the base station do not match the bits sent (407), the base station (103) initiates (409) collision maintenance such that the communication unit (101) can adjust its DPLL (331) to realign its transmissions in time.

39 Claims, 3 Drawing Sheets

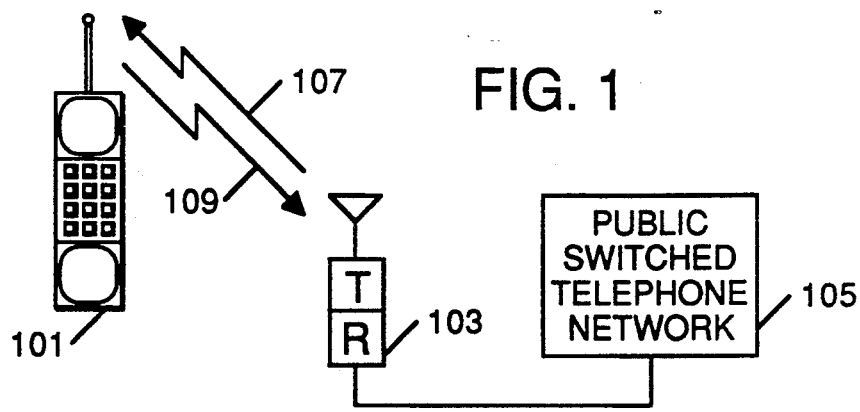
FIG. 1
FIG. 2
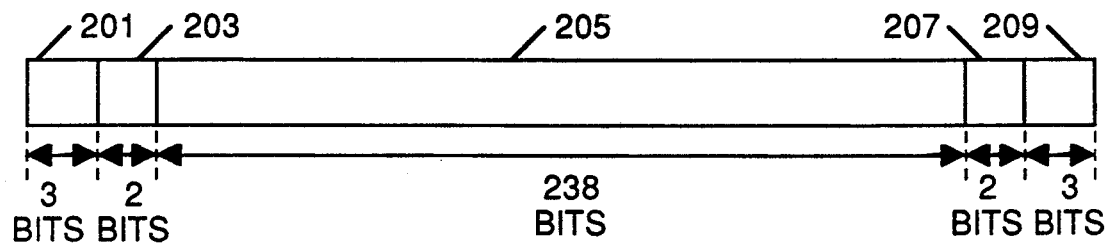
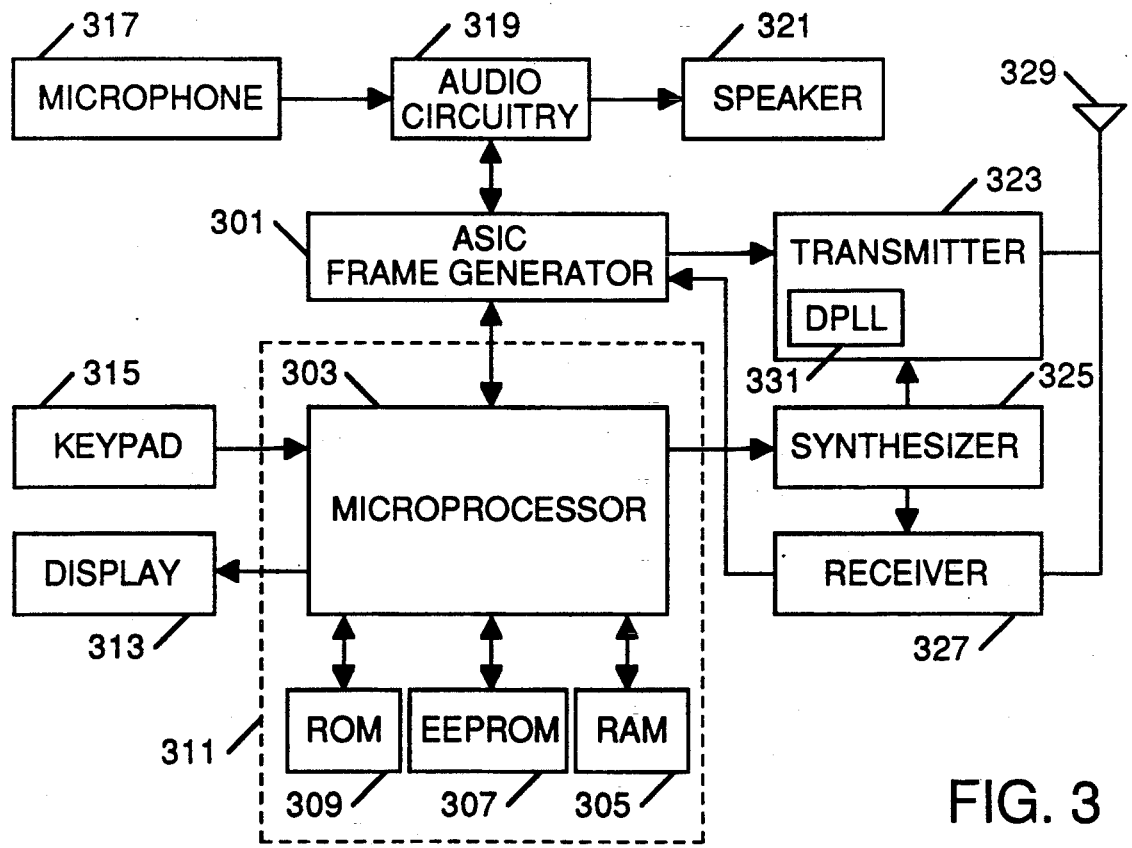
FIG. 3

SIGNAL OVERLAP DETECTION IN A COMMUNICATION SYSTEM

FIELD OF THE INVENTION

This invention relates to personal communication systems. More particularly, this invention relates to signalling methods and apparatus for personal communication systems using frequency hopping.

BACKGROUND OF THE INVENTION

There is an emerging world market need for local area wireless personal communications. In many parts of the world, government agencies have allocated frequency spectrum for this type of service. In the United States, the FCC has stated that there is no spectrum that can be granted to this service on a license primary user basis. However, the FCC's position has been interpreted to say that the Industrial, Scientific, and Medical (ISM) band may be used for this purpose on a shared secondary basis, provided low-power spread-spectrum transmissions are used. Recently, the FCC issued specific rules pertaining to this type of service.

It is apparent that if one can provide a system compliant with these rules at a low cost that is resilient to the interference that might be encountered while operating in the ISM band on a secondary basis, it would service a growing need for local area communications.

In traditional radio systems, a transmission takes place by modulating the information of the transmission about a single carrier frequency. In a frequency-hopping spread-spectrum system, the radio breaks the information to be transmitted into equal periods of time, one period known as one hop time, and transmits on a different carrier frequency for each hop time in a pseudo-random order. A radio receiver then tunes to the proper frequency at the appropriate time for each hop in order to demodulate the message. This requires a communication protocol that enables the receiver to synchronize, also known as sync for short, to the transmitted signal in both frequency and time with good audio quality. It is also necessary to be sure that messages do not collide or overlap at the base station, since loss of information would result. Reference is made to U.S. patent application Ser. No. 07/634,368, filed on Dec. 27, 1990 on behalf of James McDonald, with the same assignee as the present invention, titled "Wireless Personal Communication System" which may contain related material. Reference is also made to U.S. patent application Ser. No. 07/647,334, filed on the same date with the same assignee as the present invention on behalf of William Pickert et al., titled "Digital Communication Signalling System" which may also contain related material.

SUMMARY OF THE INVENTION

The invention encompasses a method of and apparatus for communication in a communication system with a base station and communication unit that communicate digital information messages to each other. A first message frame of a first digital information message is transmitted, having a format comprising a first boundary, a second boundary, and at least a first signal overlap detection field. The transmitted first message frame is received, and at least a second signal overlap detection field is transmitted in a second message frame of a second digital information message. A signal overlap is detected by comparing the at least a second signal overlap detection field with the at least a first signal overlap detection field. Message frames subsequent to said second message frame are adjusted in time to eliminate the signal overlap.

BRIEF DESCRIPTION OF THE DRAWINGS

FIG. 1 is a system diagram in accordance with the invention.

FIG. 2 is a bit field representation of a digitized information format which may be used in a frequency-hopping system in accordance with the invention.

FIG. 3 is a block diagram of a communication unit or base station in accordance with the invention.

DESCRIPTION OF A PREFERRED EMBODIMENT

Figure 4:
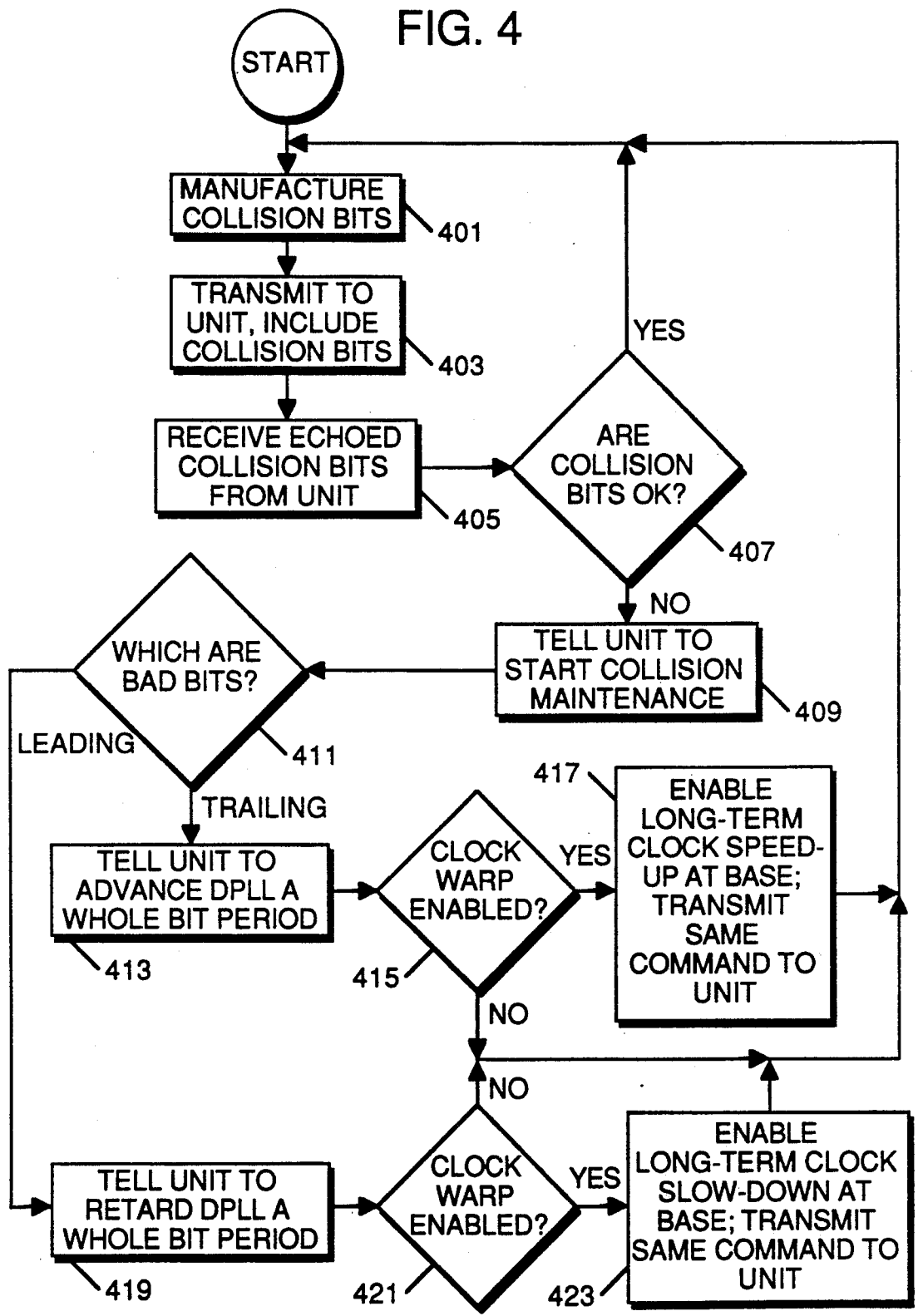
FIG. 4 is a flowchart of base station operation utilizing collision bits in accordance with the invention.

The following describes a method and apparatus for using collision bits in a communication between a communication unit and a fixed (base) station in a personal communication system using frequency-hopping spread-spectrum radio technology. Collision bits are used to realign messages in time when two transmissions in adjacent hop-time intervals overlap because of various time delays within the system. A specific bit pattern is inserted into the message format at the beginning and end of the format by the base station, the communication unit echoes the bits back in its next transmission, and if a comparison of the returned bits shows a discrepancy, the base station takes appropriate action to cause the communication unit to either speed up or slow down its transmission in order to correct the overlap situation.

FIG. 1 is a system diagram in accordance with the invention. A portable personal communication unit 101 is shown in a communication with a base station 103 which is connected to the Public Switched Telephone Network (PSTN) 105. A communication 109 originating at the portable 101 is received by the base station 103. A communication 107 originating at the base station 103 is received by the portable 101. Information necessary to allow these communications 107 and 109 to take place is transmitted in the protocol described in FIG. 1. Both the portable 101 and base station 103 use frequency-hopping spread-spectrum radio technology in the ISM frequency band to transmit and receive communications.

FIG. 2 is a bit field representation of a digitized information format which may be used in a frequency-hopping system.

A transmit ramp-up field 201 is 3 bits in length at a first boundary of the format and allows time for the transmitter to reach full power. A transmit ramp-down field 209 is 3 bits in length at a second boundary of the format and allows time for the transmitter to power down. The second field 203 and second to last field 207 are each 2 bits in length and are used to detect overlap of unsynchronized signals. These two fields 203 and 207, also known as collision bit fields, and their use are discussed in further detail in the FIG. 4 and FIG. 5 descriptions. The third bit field 205 contains digitized voice, data, and control information used in the system protocol. The five fields 201 through 209 in the format comprise a message frame. One or more frames are transmitted in each hop, and multiple message frames comprise a message.

FIG. 3 is a block diagram of a communication unit 101 or base station 103, such as is shown in FIG. 1. The hardware in the base station 103 is substantially the same, although the information stored in memory is different and the transmitter can supply more power than the communication unit. In the preferred embodiment, an ASIC (Application Specific Integrated Circuit) 301, such as a CMOS ASIC also available from Motorola, Inc., and a microprocessor 303, such as a 68HC11 microprocessor available from Motorola, Inc., combine to generate the communication protocol shown in FIG. 2. The microprocessor 303 uses RAM 305, EEPROM 307, and ROM 309, consolidated in one package 311 in the preferred embodiment, to execute the steps necessary to generate the protocol and to perform other functions, such as writing to a digital display 313, accepting information from a keypad 315, and controlling a frequency synthesizer 325. The ASIC 301 processes audio transformed by the audio circuitry 319 from a microphone 317 and to a speaker 321. Certain message fields, including the collision bits, are constructed by the microprocessor 303, and others are constructed by the ASIC 301, which generates the message frame and transfers it to a transmitter 323 that transmits through an antenna 329 using carrier frequencies produced by the frequency synthesizer 325 in the hopping manner chosen for the system and directed by the microprocessor 303. The transmitter 323 contains a DPLL (Digital Phase-Locked Loop) 331 which synchronizes the phase of the transmitted signal with the local clock signal. The DPLL 331 output is the transmit clock signal. Information received by the communication unit's antenna 329 enters the receiver 327 which demodulates the message frame using the carrier frequencies from the frequency synthesizer 325, in accord with the hopping manner chosen for the system. The ASIC 303 then parses the received message frame into its constituent parts, such as the collision bit fields, for example.

FIG. 4 is a flowchart of base station operation utilizing collision bits, as performed in the base station 103 microprocessor 303. At step 401, the base (station) manufactures the collision bits, two pseudo-random bits for the leading end (first part of the message received) and two pseudo-random bits for the trailing end (last part of the message received). The base inserts the collision bits into the collision bit fields 203 and 207 in the message format and transmits them to the communication unit at step 403. After receiving the echoed collision bits from the communication unit at step 405, the base compares the manufactured bits from step 401 to the echoed bits from step 405 at step 407. If both sets of bits completely match, the process continues with step 401. If any bits do not match, at step 407, the base tells the communication unit to start collision maintenance. If the trailing bits are bad at step 411, the base station tells the communication unit to advance its DPLL a whole bit period at step 413. If the clock warp option is enabled at step 415, the base enables a long-term (until a clock slow-down is later enabled) base station DPLL clock speed-up and transmits a DPLL clock speed-up command to the communication unit at step 417, and the process continues with step 401. If the clock warp option is enabled at step 421, the base enables a long-term (until a clock speed-up is later enabled) base station DPLL clock slow-down and transmits a DPLL clock slow-down command to the communication unit at step 423, and the process continues with step 401.

Figure 5:
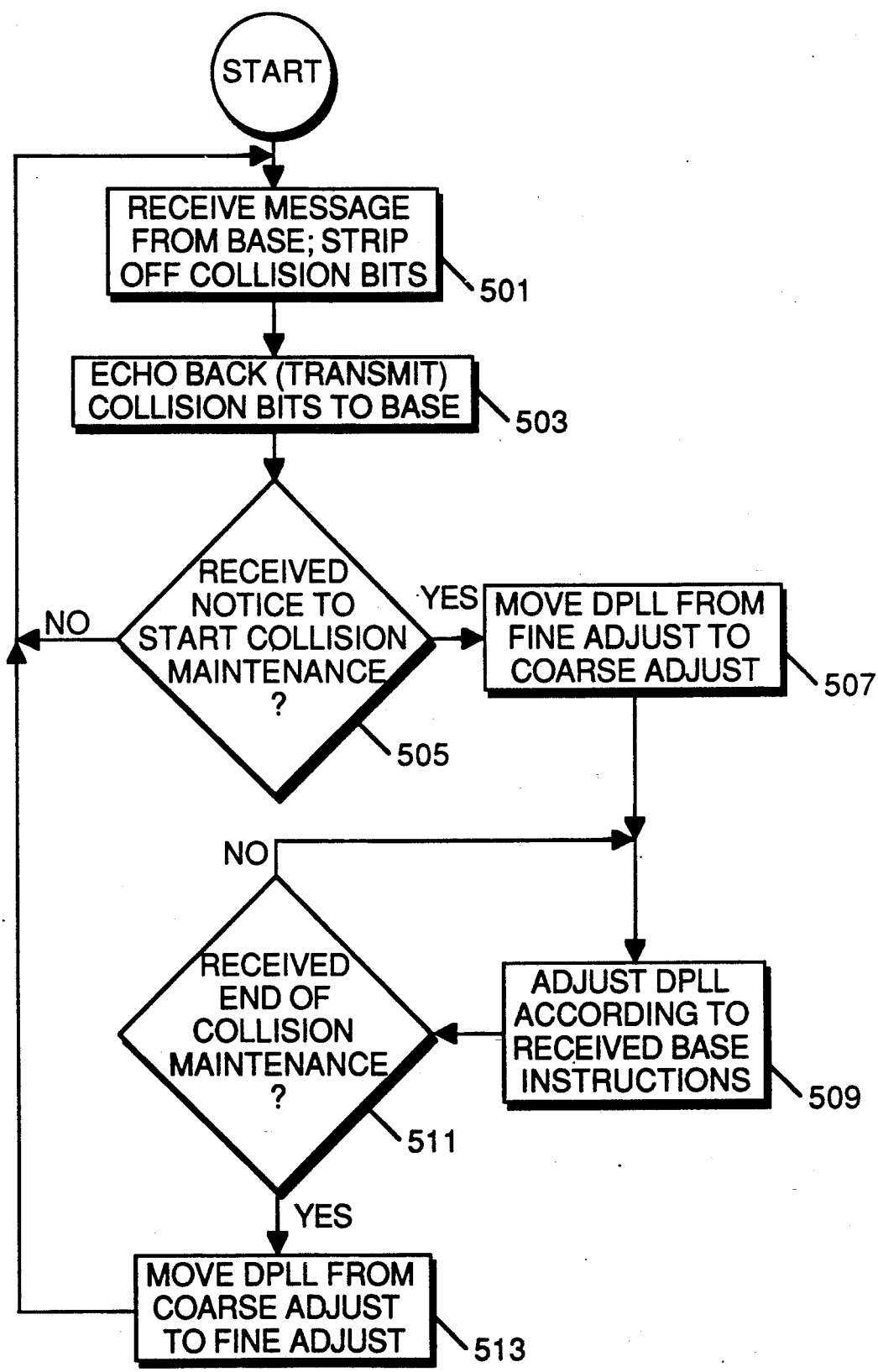
FIG. 5 is a flowchart of communication unit operation utilizing collision bits in accordance with the invention.

FIG. 5 is a flowchart of communication unit operation utilizing collision bits as performed in the (communication) unit 101 microprocessor 303. When a message is received from the base, the unit strips off the collision bits at step 501 and echoes back the collision bits, or a processed version of the bits, to the base station in its next transmission at step 503. If at step 505, the unit has not received a notice to start collision maintenance from the base station, the process continues with step 501. If at step 505, the unit has received a notice to start collision maintenance from the base station, the unit moves its DPLL from fine adjust mode to coarse adjust mode at step 507. The unit then adjusts its DPLL by either advancing or retarding it, according to received base station instructions at step 509 until an end of collision maintenance notice is received at step 511. When the end of collision maintenance notice is received at step 511, the unit moves its DPLL from coarse adjust mode to fine adjust mode at step 513 and continues the process with step 501.

What is claimed is:

1. A method of communication in a communication system with a base station and communication unit that communicate digital information messages to each other, comprising the steps of:
   transmitting a first message frame of a first digital information message, said first message frame having a format comprising a first boundary, a second boundary, and at least a first signal overlap detection field;
   receiving said transmitted first message frame;
   transmitting said at least a second signal overlap detection field in a second message frame of a second digital information message;
   detecting a signal overlap by comparing said at least a second signal overlap detection field with said at least a first signal overlap detection field; and
   adjusting, responsive to said step of detecting, message frames subsequent to said second message frame in time to eliminate said signal overlap.

2. The method of transmission of claim 1, wherein said at least a first signal overlap detection field appears closer to said first boundary than said second boundary.

3. The method of transmission of claim 1, wherein said at least a first signal overlap detection field appears closer to said second boundary than said first boundary.

4. The method of transmission of claim 1, wherein said at least a first signal overlap detection field is comprised of at least one pseudo-random digital bit.

5. The method of transmission of claim 1, further comprising the step of processing, responsive to said step of receiving, said at least a first signal overlap detection field into said at least a second signal overlap detection field.

6. A communication unit for use in a communication system with a base station and communication unit that communicate digital information messages to each other, the communication unit comprising:
   means for processing the digital information messages;
   means for receiving a first message frame of a first digital information message from the base station, said message frame having a format comprising a first boundary, a second boundary, at least a first signal overlap detection field, and frame alignment instructions;

means, coupled to said means for processing, for transmitting a second message frame of a second digital information message, said second message frame having a format comprising at least a second signal overlap detection field; and means for executing said frame alignment instructions from the base station to time align message frames subsequent to said second message frame.

7. The communication unit of claim 6, wherein said at least a first signal overlap detection field appears closer to said first boundary than said second boundary.

8. The communication unit of claim 6, wherein said at least a first signal overlap detection field appears closer to said second boundary than said first boundary.

9. The communication unit of claim 6, wherein said at least one signal overlap detection field is comprised of at least one pseudo-random digital bit.

10. The communication unit of claim 6, further comprising means for processing said at least a first signal overlap detection field into said at least a second signal overlap detection field.

11. The communication unit of claim 6, further comprising digital phase lock loop means.

12. The communication unit of claim 11, said means for executing further comprising means for advancing and retarding said digital phase lock loop means.

13. The communication unit of claim 11, wherein said means for executing further comprises means for effecting one of increasing and decreasing rate of operation of said digital phase lock loop means.

14. A method of communication in a communication unit for use in a communication system with a base station and communication unit that communicate digital information to each other, comprising the steps of:

processing the digital information messages;

receiving a first message frame of a first digital information message from the base station, said message frame having a format comprising a first boundary, a second boundary, at least a first signal overlap detection field, and frame alignment instructions;

transmitting, responsive to said steps of processing and receiving, a second message frame of a second digital information message, said second message frame having a format comprising at least a second signal overlap detection field; and executing said frame alignment instructions from the base station to time align message frames subsequent to said second message frame.

15. The method of communication of claim 14, wherein said transmitting step further comprises the step of formatting said at least a first signal overlap detection field closer to said first boundary than said second boundary.

16. The method of communication of claim 14, wherein said transmitting step further comprises the step of formatting said at least a first signal overlap detection field closer to said second boundary than said first boundary.

17. The method of communication of claim 14, wherein said transmitting step further comprises the step of formatting said at least a first signal overlap detection field with at least one pseudo-random digital bit.

18. The method of communication of claim 14, further comprising the step of processing, responsive to said step of receiving, said at least a first signal overlap detection field into said at least a second signal overlap detection field.

19. The method of communication of claim 14, wherein said step of executing further comprises the step of effecting one of advancing and retarding a digital phase lock loop.

20. The method of communication of claim 14, wherein said step of executing further comprises the step of effecting one of increasing and decreasing rate of operation of a digital phase lock loop.

21. A method of communication in a base station for use in a communication system with a base station and communication unit that communicate digital information messages to each other, comprising the steps of:

transmitting a first message frame of a first digital information message, said first message frame having a format comprising a first boundary, a second boundary, and at least a first signal overlap detection field;

receiving a second message frame of a second digital information message, said second message frame having a format comprising at least a second signal overlap detection field;

comparing said at least a first signal overlap detection field with said at least a second signal overlap detection field; and informing, responsive to said step of comparing, the communication unit to time align message frames subsequent to said second message frame with additional frame alignment instructions to eliminate signal overlap.

22. The method of communication of claim 21, wherein said transmitting step further comprises the step of formatting said at least a first signal overlap detection field closer to said first boundary than said second boundary.

23. The method of communication of claim 21, wherein said transmitting step further comprises the step of formatting said at least a first signal overlap detection field closer to said second boundary than said first boundary.

24. The method of communication of claim 21, further comprising the step of effecting one of an increase and decrease of rate of operation of a digital phase lock loop in accordance with said frame alignment instructions.

25. The method of communication of claim 21, wherein said transmitting step further comprises the step of formatting said at least a first signal overlap detection field with at least one pseudo-random digital bit.

26. The method of communication of claim 25, wherein said step of comparing further comprises the steps of:

matching said at least one pseudo-random digital bit of said at least a first signal overlap detection field with said at least one pseudo-random digital bit of said at least a second signal overlap detection field; and creating, responsive to said step of matching, frame alignment instructions to make forward and reverse alignment corrections.

27. A base station for use in a communication system with a base station and communication unit that communicate digital information to each other, the base station comprising:

means for transmitting a first message frame of a first digital information message, said first message frame having a format comprising a first boundary, a second boundary, and at least a first signal overlap detection field;

means for receiving a second message frame of a second digital information message, said second message frame having a format comprising at least a second signal overlap detection field;

means for comparing said at least a first signal overlap detection field with said at least a second signal overlap detection field; and means, coupled to said means for comparing, for informing the communication unit to time align message frames subsequent to said second message frame with additional frame alignment instructions to eliminate signal overlap.

28. The base station of claim 27, wherein said at least a first signal overlap detection field appears closer to said first boundary than said second boundary.

29. The base station of claim 27, wherein said at least a first signal overlap detection field appears closer to said second boundary than said first boundary.

30. The base station of claim 27, wherein the communication unit further comprises digital phase lock loop means, and said frame alignment instructions include instructions to increase and decrease rate of operation of said digital phase lock loop means.

31. The base station of claim 27, wherein said at least a first signal overlap detection field is comprised of at least one pseudo-random digital bit.

32. The base station of claim 31, wherein said means for comparing further comprises:

means for matching said at least one pseudo-random digital bit of said at least a first signal overlap detection field with said at least one pseudo-random digital bit of said at least a second signal overlap detection field; and means, coupled to said means for matching, for creating frame alignment instructions to make forward and reverse alignment corrections.

33. The base station of claim 27, further comprising means for processing said at least a first signal overlap detection field to match said at least a second signal overlap detection field.

34. The base station of claim 27, further comprising means for echoing said at least a first signal overlap detection field into said at least a second signal overlap detection field.

35. The method of communication of claim 21, further comprising the step of processing, responsive to said step of receiving, said at least a first signal overlap detection field to match said at least a second signal overlap detection field.

36. The method of communication of claim 21, further comprising the step of echoing, responsive to said step of receiving, said at least a first signal overlap detection field into said at least a second signal overlap detection field.

37. The method of transmission of claim 1, further comprising the step of echoing, responsive to said step of receiving, said at least a first signal overlap detection field into said at least a second signal overlap detection field.

38. The communication unit of claim 6, further comprising means for echoing said at least a first signal overlap detection field into said at least a second signal overlap detection field.

39. The method of communication of claim 14, further comprising the step of echoing, responsive to said step of receiving, said at least a first signal overlap detection field into said at least a second signal overlap detection field.

* * * * *